Feb. 5, 1952 — M. SINCLAIR — 2,584,301
MOATED DOG FEEDER
Filed Nov. 21, 1949
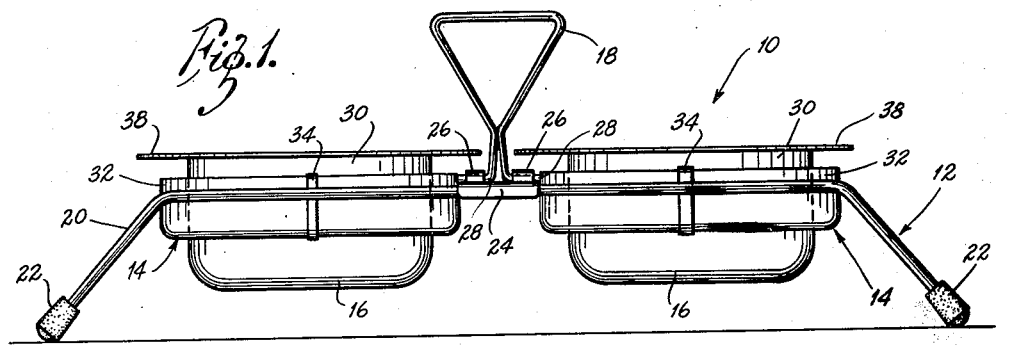
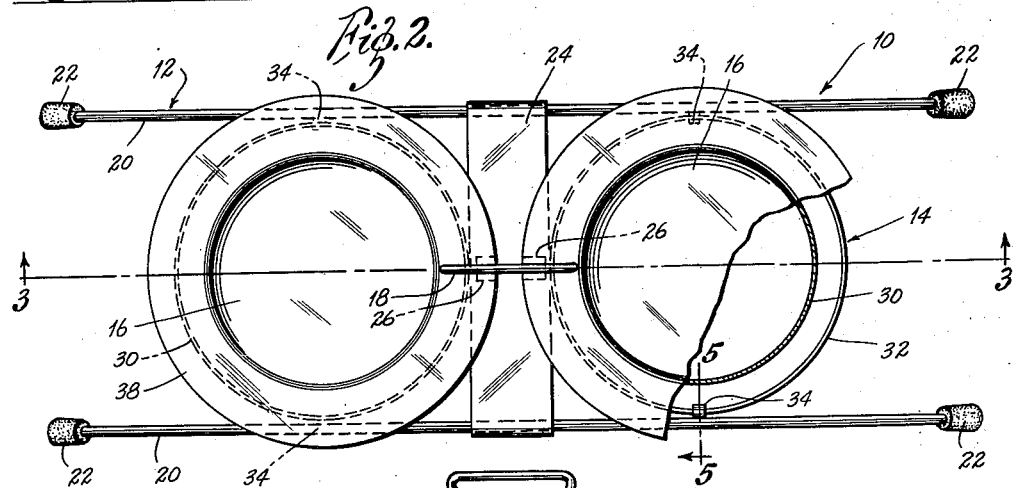
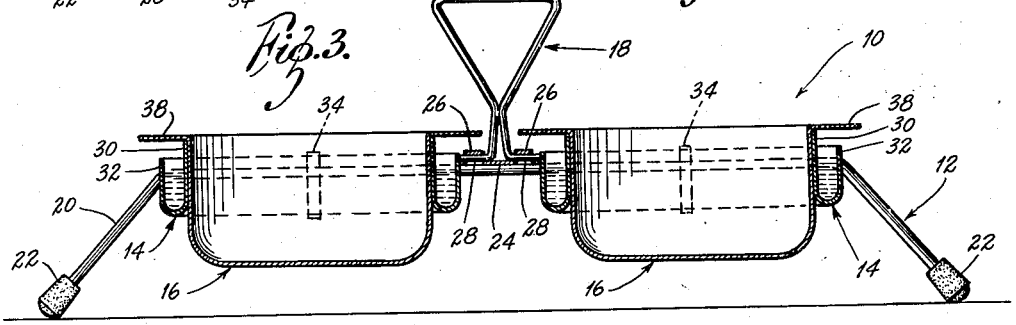
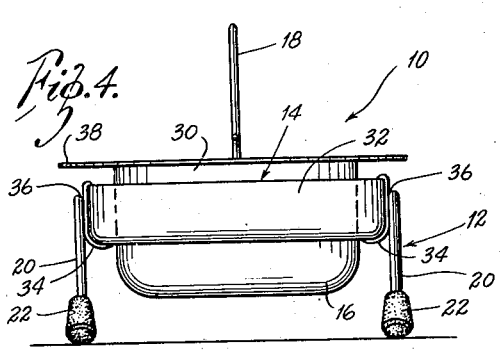
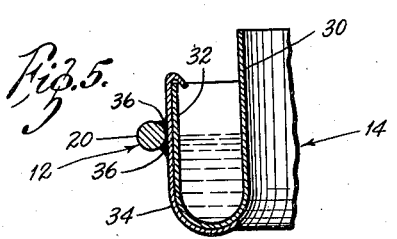
INVENTOR:
MELROY SINCLAIR,
BY Rogers & Ezell,
ATTORNEYS.

Patented Feb. 5, 1952

2,584,301

UNITED STATES PATENT OFFICE 2,584,301

MOATED DOG FEEDER

Melroy Sinclair, Richmond Heights, Mo., assignor to Sinclair Industries, Inc., St. Louis, Mo., a corporation of Missouri Application November 21, 1949, Serial No. 128,519

5 Claims. (Cl. 119—61)

The present invention relates generally to devices for feeding animals, and is more particularly concerned with devices commonly known as "dog feeders."

In brief, the present invention contemplates the provision of food and drink containers for dogs which are supported from the ground or other support by a base and which are isolated from continuous contact with the ground by water receiving moats, thereby eliminating the infesting of the animal's food and drink with ants and other bugs.

Therefore, an object of the present invention is to provide a novel dog feeding device which incorporates moat construction for the purpose of preventing ants and other insects from crawling onto the food from the ground.

Another object is to provide a novel dog feeding device which incorporates one or more food or drink containers, the interior of which is isolated from continuous contact with the ground by water.

Another object is to provide a novel dog feeding device of portable type adapted to be supported upon the ground or other base where ants and other insects are likely to be, which is constructed to prevent such ants and other insects from reaching food or drink placed in the device for feeding dogs or other animals.

Another object is to provide a novel dog feeding device incorporating supported food or drink containers which are surrounded by water or the like receiving moats to prevent ants and other insects from crawling onto the food placed for consumption by the dog.

Other objects are to provide a novel dog feeding device which is sturdy in construction, which is economical to manufacture, which includes food containers with flanges disposed over the moat constructions in order to prevent food from dropping into the moats, which may be moved from place to place without spilling food, drink or liquid material in the moats, which may be readily cleaned to maintain the same sanitary, and which is entirely satisfactory and efficient for feeding dogs and similar animals in a clean and sanitary manner.

The foregoing and other objects and advantages are apparent from the following description taken with the accompanying drawing, in which:

Fig. 1 is a side elevational view of a dog feeding device incorporating the teachings of the present invention;

Fig. 2 is a plan view thereof, a portion of one of the feeding containers being broken away to more clearly disclose the moat construction;

Fig. 3 is a vertical longitudinal cross-sectional view on substantially the line 3—3 of Fig. 2;

Fig. 4 is an end elevational view of the device; and

Fig. 5 is an enlarged vertical transverse cross-sectional view on substantially the line 5—5 of Fig. 2.

Referring to the drawing more particularly by reference numerals, 10 indicates generally a dog feeding device incorporating the concepts of the present invention. Broadly, the dog feeding device 10 includes a supporting frame 12, moat elements 14 mounted on the supporting frame 12, food or drink containers 16, and a handle construction 18 for moving the device 10 from place to place.

More specifically considering the several components of the present dog feeding device 10, in a preferred embodiment the supporting frame 12 includes parallel U-shaped combined leg and body members 20 on the free depending leg portions of which are rubber feet 22. A transverse metal strap 24 has its free ends curled around and engaging the body portions of the members 20. Intermediate its ends, the strap 24 is formed with aligned spaced extrusions 26 defining openings which receive opposed aligned free ends 28 of the handle 18, as is clear from Figs. 1 and 3. A pivotal relationship exists between the free ends 28 of the handle 18 and the extrusions 26.

The moat elements 14 are of annular form and of U-cross section, including an inner wall 30 and an outer wall 32, the latter being at a lower elevation than the former for the purpose set forth below. Opposed spring clips 34 engage the outer walls 32 of the moat elements 14 which are removable therefrom. As is clear from Fig. 5, the spring clips 34 are welded at 36 to the members 20. Thus, the moat elements 14 may be removed from the supporting frame 12 for cleaning, replacement, or the like.

The containers 16 are bowl-shaped, each including a wide horizontal flange 38 which extends well outwardly over the associated moat element 14. Each container 16 rests upon the upper edge of the inner wall 30 of its respective moat element 14.

In use, the dog feeding device 10 may be placed upon the ground or other base for use by a dog or other animal. When a two-container device 10, such as that shown in the drawing, is employed, normally food is placed in one container 16 and water in the other. Water is placed in both of the moat elements 14 up to a point approaching the top of the outer walls 32. In some instances, it may be desirable to add to the water, or to substitute for it, a liquid which is objectionable to the taste and smell senses of ants and other insects, although normally water is adequate to repel insects. Ants and other insects will not cross water in the moat elements 14 and, hence, the food and drink remain uncontaminated by them.

It is manifest that the flanges 38 extend far enough outwardly over the moat elements 14 to prevent food from being dropped into them during feeding by an animal. It is desirable to prevent food from falling in the moat elements 14, inasmuch as floating foodstuffs may serve as rafts to convey insects from the outer to the inner wall.

It is manifest that there has been provided a dog feeding construction which fulfills the objects and advantages sought therefor. It is to be understood, of course, that a single container 16, or more than two containers 16, may be employed incorporating the inventive features of the present device 10. Further, the moat elements 14 and containers 16 may assume any desired configurations.

It is to be understood that the foregoing description and the accompanying drawing have been given by way of illustration and example. It is also to be understood that changes in form of the elements, rearrangements of parts, and substitution of equivalent elements, which will be obvious to those skilled in the art, are contemplated as within the scope of the present invention which is limited only by the claims which follow.

What is claimed is:

1. In a feeding device of the kind described, in combination, a collapsible support including two spaced pairs of legs, a cross member pivotally connecting said pairs of legs and maintaining them in spaced relation, a moat member of J-cross section removably mounted on said support in position above a plane through the free ends of the legs and maintaining said support in supporting relation, and a food container removably supported on said moat member interiorly thereof out of contact both with said supporting legs and with the surface on which said device rests so that the food container is protected from crawling insects when water or the like is placed in the moat member.

2. In a feeding device of the kind described, in combination, a supporting frame including two spaced body and leg members, a cross member connected to said body and leg members and maintaining the body portions in spaced relation, a spring clip member secured to the body portion of each body and leg member, a moat member of J-cross section removably mounted on said clips for support by said body and leg members, and a container removably mounted on said moat member for support.

3. In a feeding device of the kind described, in combination, a supporting frame including two spaced body and leg members, a cross member connected to said body and leg members and maintaining the body portions in spaced relation, a spring clip member secured to the body portion of each body and leg member, a moat member of J-cross section removably mounted on said clips for support by said body and leg members, and a container removably mounted on said moat member for support, said container including a peripheral outwardly extending flange resting upon the upper free edge of the inner wall of said moat member and extending outwardly beyond said moat member to serve as a shield therefor, the inner wall of said moat member being the higher wall thereof.

4. In a feeding device of the kind described, in combination, a supporting frame including two spaced body and leg members, a cross member pivotally connected to the body portions of said body and leg members permitting pivoting of said latter members into a plane substantially parallel with said cross member, a spring clip member secured to the body portion of each body and leg member, a moat member of J-cross section removably mounted on said clips for support and maintaining said body and leg members in supporting relation, and a container removably mounted on said moat member for support.

5. In a feeding device of the kind described, in combination, a supporting frame including two spaced body and leg members, a cross member connected to the body portions of said body and leg members substantially midway thereof, a hand-carry handle pivotally connected to said cross member substantially centrally thereof, a clip member secured to the body portion of each body and leg member at each side of said cross member, a moat member of J-cross section removably mounted on each pair of opposed clip members for support and maintaining said body and leg members in supporting relation, and a container mounted on each moat member for support.

MELROY SINCLAIR.

REFERENCES CITED

The following references are of record in the file of this patent:

UNITED STATES PATENTS

| Number | Name | Date |
| --- | --- | --- |
| D. 105,450 | Clifton | July 27, 1937 |
| 747,677 | Bierley | Dec. 22, 1903 |
| 2,191,811 | Trampier, Sr. | Feb. 27, 1940 |
| 2,366,584 | Woodward | Jan. 2, 1945 |

FOREIGN PATENTS

| Number | Country | Date |
| --- | --- | --- |
| 738,069 | France | Oct. 11, 1932 |
| 821,389 | France | Aug. 23, 1937 |